United States Patent
Reuschel

(10) Patent No.: US 7,197,385 B2
(45) Date of Patent: Mar. 27, 2007

(54) METHOD AND APPARATUS FOR ADJUSTING A CONTACT FORCE IN A MOTOR VEHICLE DRIVE TRAIN

(75) Inventor: Michael Reuschel, Ottersweier (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 103 days.

(21) Appl. No.: 10/759,518

(22) Filed: Jan. 16, 2004

(65) Prior Publication Data

US 2004/0225428 A1 Nov. 11, 2004

(30) Foreign Application Priority Data

Jan. 17, 2003 (DE) .................. 103 01 623

(51) Int. Cl.
*B60K 23/02* (2006.01)
*F16H 61/00* (2006.01)

(52) U.S. Cl. .................. 701/51; 474/18; 192/85 F

(58) Field of Classification Search .................. 701/51; 474/18, 69, 28; 192/103 F, 103 FA, 105 F, 192/85 F, 87.12, 88 A
See application file for complete search history.

(56) References Cited

U.S. PATENT DOCUMENTS

| | | | | |
|---|---|---|---|---|
| 4,619,629 A | * | 10/1986 | Shigematsu et al. | 474/28 |
| 4,665,773 A | * | 5/1987 | Hiramatsu et al. | 477/39 |
| 4,790,214 A | * | 12/1988 | Hattori et al. | 477/48 |
| 5,845,755 A | * | 12/1998 | Wahl et al. | 192/85 F |
| 5,879,253 A | * | 3/1999 | Friedmann et al. | 474/18 |
| 6,378,669 B1 | * | 4/2002 | Kurasako et al. | 188/218 XL |
| 6,558,286 B1 | * | 5/2003 | Gulia | 475/214 |
| 6,597,977 B1 | * | 7/2003 | Danz et al. | 701/51 |
| 6,695,115 B2 | * | 2/2004 | Lindner et al. | 192/70.25 |
| 6,721,643 B1 | * | 4/2004 | Hanggi et al. | 701/51 |

* cited by examiner

*Primary Examiner*—Dalena Tran
(74) *Attorney, Agent, or Firm*—Alfred J. Mangels

(57) ABSTRACT

A method and apparatus for regulating the contact force between two frictionally-engaged torque-transmitting components of a motor vehicle drive system. A contact force between an endless torque-transmitting device and a pair of conical disks of a continuously variable transmission is determined by an adjusting value that is a function of a preliminary adjusting value and a regulator output value. The preliminary adjusting value is determined by the value of at least one operating parameter of the drive system, and the regulator output value is determined by comparing the actual value of an operating parameter with a target value of the operating parameter.

12 Claims, 7 Drawing Sheets

METHOD AND APPARATUS FOR ADJUSTING A CONTACT FORCE IN A MOTOR VEHICLE DRIVE TRAIN

BACKGROUND OF THE INVENTION

1. Field of the Invention

The present invention relates to a method and an apparatus for adjusting the contact force between two frictionally-engaged components of a drive system. More particularly, the present invention relates to a method and a control apparatus for a drive system having components that are frictionally driven to transmit torque, for example by an endless torque-transmitting means that frictionally transmits torque between pairs of conical disks of a continuously variable transmission, in which the transmission ratio can be steplessly changed, and that enables adjustment of the contact force between the frictionally-engaged components.

2. Description of the Related Art

Frictionally-engaged torque-transmitting assemblies included in the drive train of a motor vehicle, such as clutches, including converter lock-up clutches in the torque converter of an automatic transmission, continuously variable transmission ratio transmissions incorporating endless torque-transmitting means (e.g., continuously variable transmissions, friction wheel transmissions), and also brakes, are being increasingly automated or operated by their own actuators. The control or regulation of the torque that is frictionally-transmitted by a particular assembly should be as low as possible to unburden the actuators, as well as for lower energy consumption and higher control or regulation accuracy, yet high enough to avoid permanent slippage that could lead to rapid wear or destruction of the components that frictionally transmit the torque. A precise adjustment of the torque-transmitting capacity between two frictionally-engaged torque-transmitting components and/or an exact adjustment of the contact force between two frictionally-engaged torque-transmitting components is accordingly of great significance.

SUMMARY OF THE INVENTION

The present invention is based upon the task of providing a method and apparatus by which the contact force between two frictionally-engaged torque-transmitting assemblies can be adjusted in such a way that it corresponds as closely as possible with the particular requirements.

That task is solved by means of a method and apparatus for the adjustment of the contact force between two frictionally-engaged torque-transmitting components of a drive system, especially between an endless torque-transmitting means and a pair of conical disks of a continuously variable transmission having a steplessly variable transmission ratio. The contact force is determined from an adjusting value that is a function of at least a preliminary adjusting value and a regulator output value, whereby the preliminary adjusting value is determined by the value of at least one operating parameter of the drive system, and the regulator output value is determined by comparing the actual value of an operating parameter with a target value of the operating parameter.

In accordance with the invention, control of the contact force, which can be dynamically quick, is effected by switching on a regulator, by means of which the preliminarily-controlled contact force can be adjusted to precisely meet the particular requirements. In that way it is possible to achieve exact adjustment of given target values. The regulator that is used can suitably be a PI (proportional+integral) regulator. Methods in which the target/actual value comparison is carried out by means of an adaptation method are also advantageous.

It is advantageous for the regulator output value to be implemented only under certain operating conditions of the drive system, that is, the regulation algorithm and/or the adaptation method function only under certain operating conditions. In that context, those conditions suitably include quasi-static operating conditions, among others.

Advantageously, a preliminary adjusting value and the regulator output value are in a direct relationship with the contact force, that is, at least one preliminary adjusting value and the regulator output value refer to physical values such as force, pressure, moment, whereby a simple reference to the operating mode in which the respective value acts on the controlled system can be produced.

The adjusting value is preferably generated by the addition of at least one preliminary adjusting value and the regulator output value.

A preliminary adjusting value can depend, for example, on the moment to be transmitted.

In one embodiment of a method in accordance with the invention, in which one of the components is an endless torque-transmitting means and the other component is a conical disk of a continuously variable transmission, a preliminary adjusting value advantageously depends upon the rotational speed of a conical disk pair and the transmission ratio of the continuously variable transmission.

The preliminary adjusting value advantageously increases with an increasing moment and/or a shorter transmission ratio and/or a smaller running radius of the endless torque-transmitting means in the first conical disk pair.

The determination of the control difference can include a method by which the actual value of an operating parameter is determined by correlation with the change in a value that affects the value of the operating parameter.

In a further embodiment of a method in accordance with the invention, a relationship between a change of an input value and a thereon-dependent change of an operating parameter that is utilized for the regulator output value is drawn upon for the determination of the preliminary adjusting value.

When one of the components is an endless torque-transmitting means and the other component is a conical disk of a continuously variable transmission, the control difference is advantageously dependent upon the slippage of the continuously variable transmission.

When the slippage exceeds a threshold value, an additional value is advantageously applied to the adjusting value.

In an additional embodiment of a method in accordance with the invention, at least one additional component, calculated from a model of the drive train, is applied to the adjusting value. That is especially advantageous in such driving conditions where wheel-side torque shocks can influence the torque-transmitting components, and within a short time they can then exhibit undesired slippage. A drive train model for calculating the effects of those wheel-side torque shocks on the torque-transmitting component can be achieved, for example, by the solution of a second-order differential equation. By means of that differential equation, extrapolation into the future is possible, whereby appropriate protective measures can be undertaken by means of the adjusting value. It is preferable to include in that differential equation, along with the corresponding inertial moments of the drive train, the wheel rotational speeds, the transmission ratio of the variable speed drive, and the rotational speeds and/or the rotational speed gradients of both pairs of conical disks.

The apparatus for adjusting the contact force between two frictionally-engaged torque-transmitting components of a drive system, especially between an endless torque-transmitting means and a pair of conical disks of a continuously variable transmission with a steplessly variable transmission ratio, includes sensors for determining operating parameters of the drive train, at least one actuator for the adjustment of the contact force, and an electronic control unit with a microprocessor and associated program storage unit and data storage unit, whereby the electronic control unit is designed for the implementation of a method in accordance with one of the above-described methods.

The invention can be applied to all types of frictionally-engaged torque-transmitting components included in a drive system.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
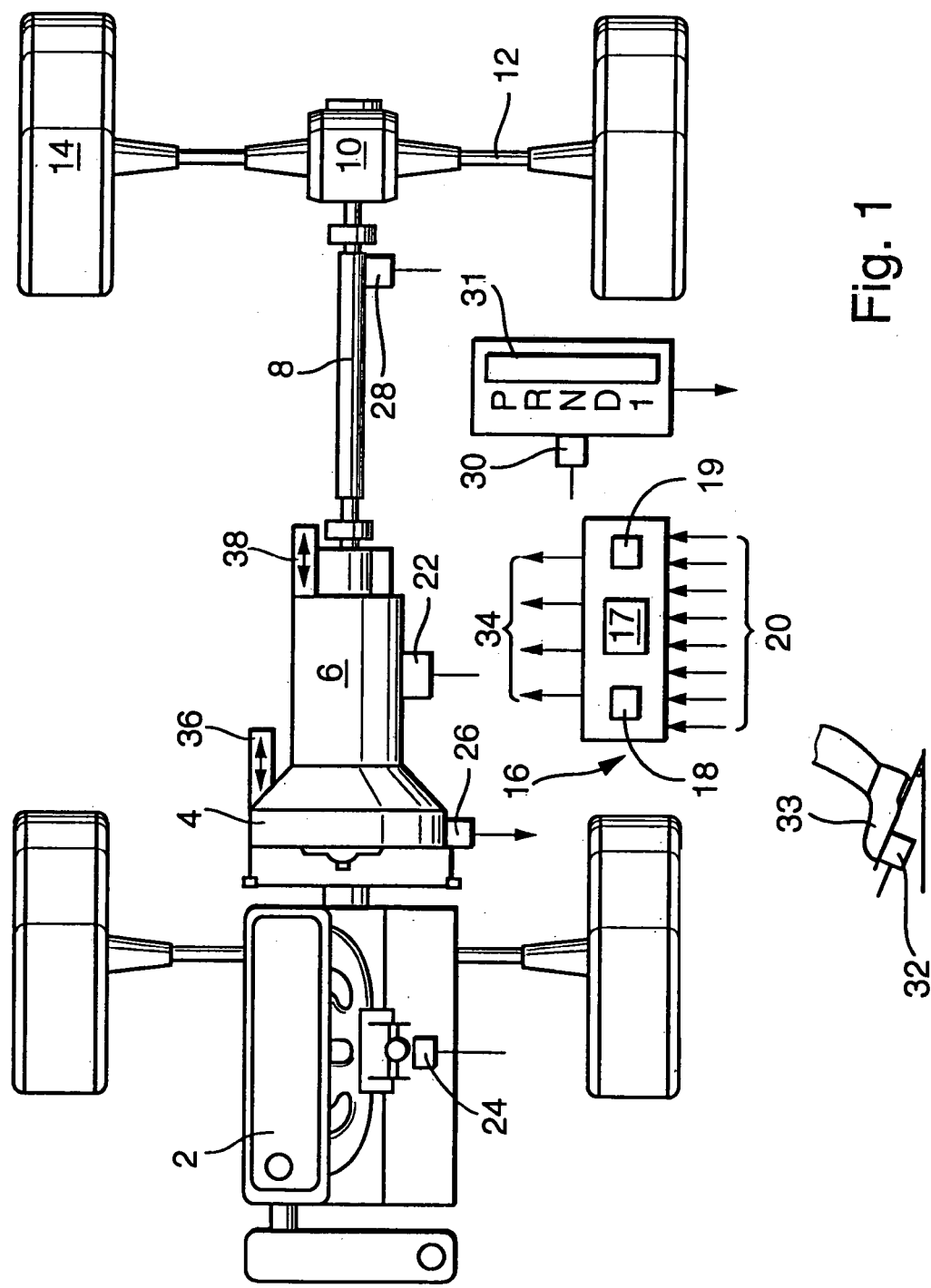
FIG. 1 is a schematic diagram showing a motor vehicle drive train.

FIG. 1 shows a motor vehicle that includes an engine 2, which is connected through a clutch 4 and a transmission 6 with a propeller shaft 8. In the embodiment shown, propeller shaft 8 drives the rear wheels 14 of the vehicle through a differential 10 and a pair of axle shafts 12.

An electronic control unit 16 that contains a microprocessor 17, a program storage unit 18, and a data storage unit 19, includes inputs 20 that are connected with sensors. The sensors can include, for example, a sensor 22 for determining the rotational speed of a transmission input shaft, a throttle valve position sensor 24, an engine rotational speed sensor 26, a propeller shaft rotational speed sensor 28, a sensor 30 for determining of the position of a manually operable transmission actuation unit 31, a sensor 32 for determining of the position of an accelerator pedal 33, and additional sensors if necessary.

Outputs 34 of electronic control unit 16 are connected with a clutch actuation unit 36 and a transmission actuation unit 38, as well as preferably with an engine control unit (not shown).

Transmission 6, in the embodiment shown, is a continuously variable transmission, or a CVT-transmission, with a hydraulically controlled actuation unit 38.

Figure 2:
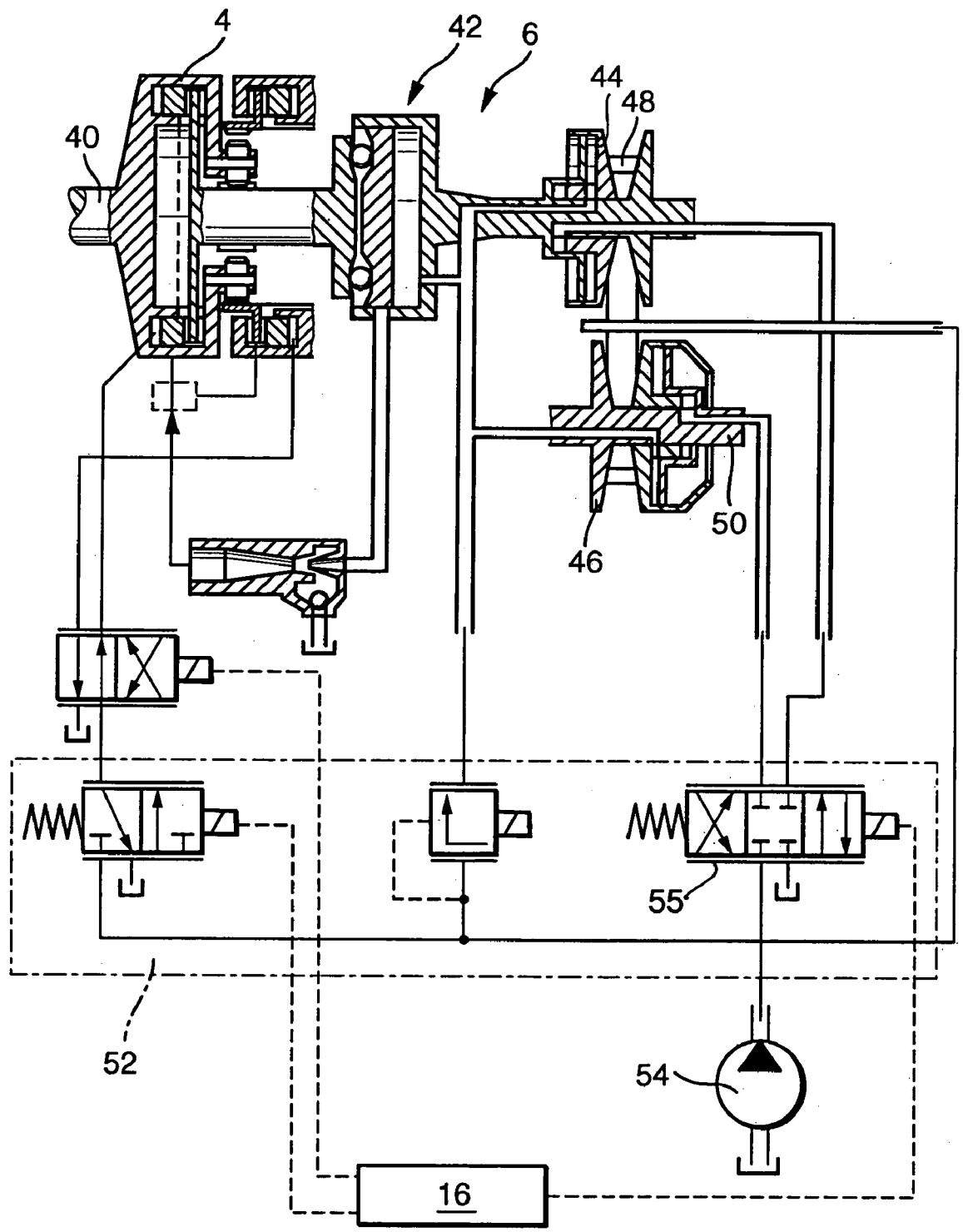
FIG. 2 is a cross-sectional view of a continuously variable transmission with an input-side clutch.

FIG. 2 shows components of clutch 4 and of transmission 6, as well as of their actuation units.

A drive shaft 40 is non-rotatably connected with the crankshaft of engine 2 and drives a first pair of conical disks 44 of the continuously variable transmission 6 through clutch 4 and a torque sensor 42. The first pair of conical disks 44 is connected with a second pair of conical disks 46 by an endless torque-transmitting means 48. The endless torque-transmitting means 48 is in frictional contact with each of the pairs of conical disks 44 and 46. The second pair of conical disks 46 drives the propeller shaft 8 (see FIG. 1) through an output shaft 50.

A hydraulic system 52 that is pressurized by a pump 54, is provided for actuation of the clutch and the transmission. The hydraulic valves are controlled by electronic control unit 16 (see FIG. 1).

The contact pressure between the conical disks and the endless torque-transmitting means is effected hydraulically in the illustrated embodiment. It can, however, also be produced in other ways, for example by means of electric motors, springs, centrifugal force, and the like. It is important for at least a portion of the contact force to be freely controllable by means of a final control unit.

In the illustrated embodiment each of the pairs of conical disks 44, 46 has two pressure chambers, to one of which chambers is applied a pressure controlled by torque sensor 42, and to the other of which chambers is applied a pressure controlled by an electronically controllable valve 55.

Figure 3:
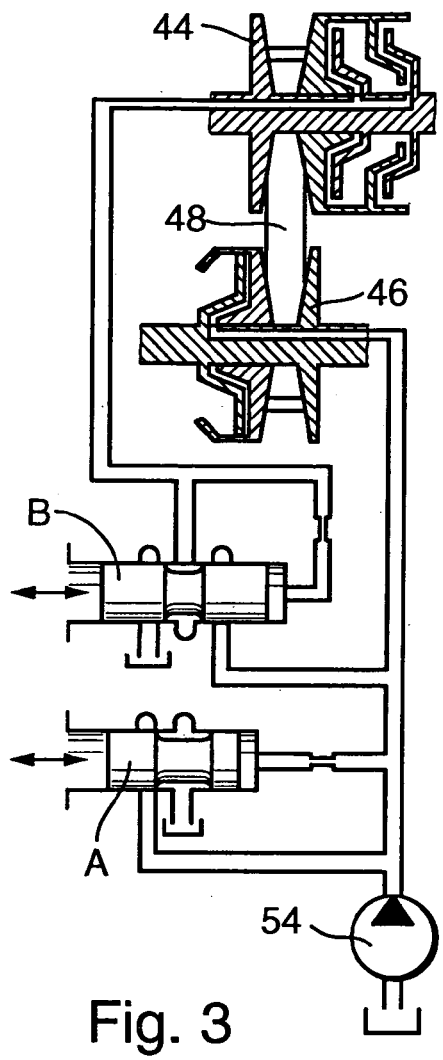
FIG. 3 is a hydraulic layout for the control of a continuously variable transmission.
Figure 4:
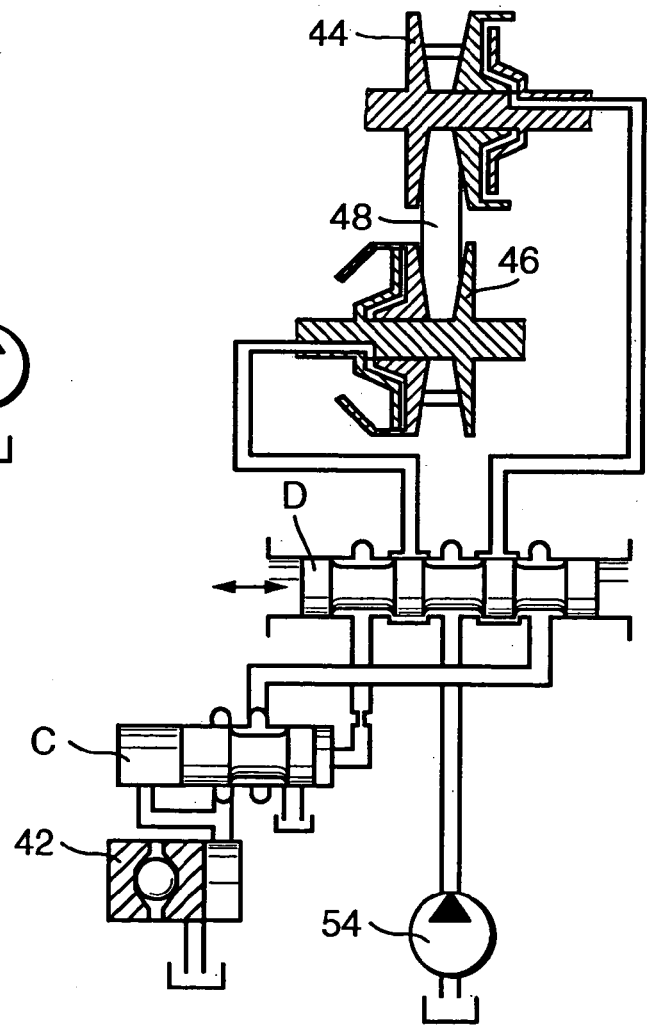
FIG. 4 is another hydraulic layout for the control of a continuously variable transmission.

Two further variants of embodiments of a hydraulic control system are shown in FIGS. 3 and 4.

As shown in FIG. 3, valve A controls the pressure that is applied to second pair of conical disks 46 and valve B controls the pressure that is applied to first pair of conical disks 44. In that way, the contact force is controllable by valve A while adjustment of the transmission ratio takes place with valve B. Valve A is freely controllable by electronic control unit 16.

In the embodiment shown in FIG. 4, the contact force is controlled by valve C, which can be controlled by torque sensor 42 and, additionally, by the electronic control unit. Thereby a part of the contact pressure is freely controllable and another part is controllable as a function of the torque. The adjustment of the pairs of conical disks takes place as a result of a pressure differential between the pairs of conical disks 44 and 46 produced by valve D.

The construction, components, and operation of the systems described above are known and the details will therefore not be further explained.

As set forth earlier herein, excessive contact pressure between the pairs of conical disks and the endless torque-transmitting means has negative effects on the efficiency of the variable speed unit (pairs of conical disks with an endless torque-transmitting means) and thereby on the fuel consumption of the motor vehicle. Additionally, the life span of the vehicle is adversely affected. Too little contact pressure results in excessive slippage of the variable speed unit, which has a negative effect on its life span and performance. Accordingly, for a more precise adjustment of the contact pressure, it is advisable to control valve 55 (see FIG. 2), valve A (see FIG. 3), or valve C (see FIG. 4) by means of electronic control unit 16.

To calculate a necessary contact pressure or a necessary contact force between the conical disks and the endless torque-transmitting means, the engine torque is utilized along with various input values, such as the particular transmission ratio of the continuously variable transmission (which can be determined from the output signals of sensors 22 and 28), and the rotational speed of, for example, the output side pair of conical disks 46, and appropriate control valves, composed of, for example, a magnetic proportioning valve, a sequencing valve, and corresponding pressure chambers. The torque can be determined by torque sensor 42 and supplied directly to a valve. It can be computed in electronic control unit 16, for example, from the position of a load actuator of engine 2 as well as the rotational speed of engine 2. In view of the possible inaccuracies in the torque determination (for example by calculation) and variations in the required contact pressure needed by the transmission (both throughout the life span of the transmission as well as between one transmission and another), a mechanical-hydraulic torque sensing unit provides only a rigidly predetermined contact pressure setting, a contact pressure higher than that required is frequently provided for safety reasons.

Figure 5:
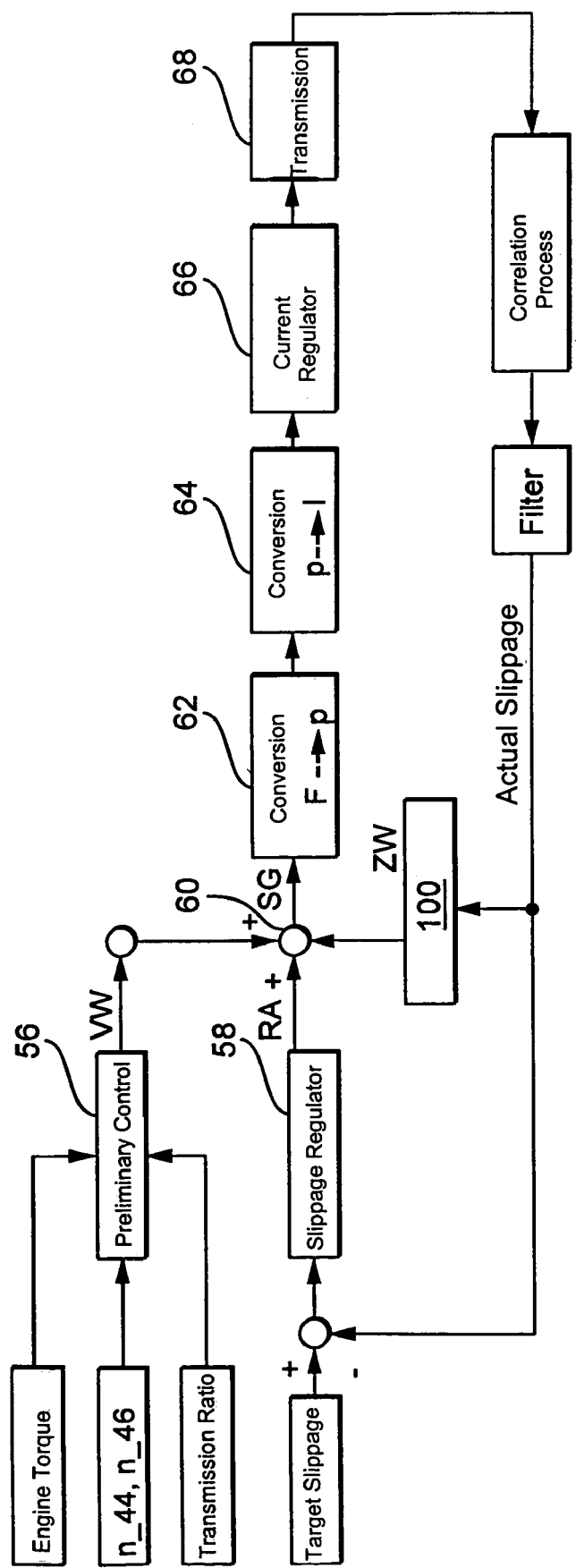
FIG. 5 is a flow diagram showing the steps of a method in accordance with the present invention.

FIG. 5 shows an example of a method in accordance with the invention, by means of which a required contact force can be adjusted with extraordinary precision.

Referring to FIG. 5, the engine torque is calculated, for example from signals provided by sensors 24 and 26 (see FIG. 1), the rotational speed of the input side pair of conical disks 44 provided by sensor 22, the rotational speed of the output side pair of conical disks 46 provided by sensor 28, and the transmission ratio of the continuously variable transmission is determined with the aid of sensors 22 and 28.

The four values identified above are provided to a preliminary control unit 56, which is included in electronic control unit 16 and which calculates a preliminary adjusting value VW in accordance with algorithms and/or performance characteristics stored in the electronic control unit, which directly determines the contact force and/or a contact pressure. The preliminary control process enables the rapid and extremely dynamic adjustment of the particular appropriate operating point for the system as a function of the input values of the engine torque, the rotational speed of the pairs of conical disks 44 and 46, and the transmission ratio.

Because the preliminary control does not take into account fine details and specific characteristics, the tendency is to design it in the direction of overpressure. To avoid that, the actual slippage of the continuously variable transmission is determined, for example with the aid of sensors 22 and 28 as well as an additional sensor (not shown) that determines the speed of the endless torque-transmitting means, or in additional ways as set forth below, and is supplied to the input of a slippage regulator 58. A target slippage value (stored in electronic control unit 16), which, for example, is a function of the engine torque, the engine rotational speed, and the transmission ratio of the transmission, is supplied as another input to slippage regulator 58. At the output of slippage regulator 58, a regulator output value RA is produced as a function of the difference between the actual slippage and the target slippage. The regulator output value, in accordance with its sign, is subtracted from or added to the preliminary adjusting value in an addition step 60, so that an adjusting value SG, which provides the contact force and/or the contact pressure between the endless torque-transmitting means and the conical disks, is produced as the output of addition step 60.

From that adjusting value, for example the contact force, the corresponding contact pressure and the required current for an electromagnetic control are calculated in conversion units 62 and 64, which can be included in the electronic control unit or in transmission actuation unit 38 (see FIG. 1).

The calculation in step 62 and/or step 64 takes into consideration forces that are already present (such as centrifugal or spring forces) or pressures (offset pressure and/or backpressure) that are already present. The current is then supplied to a current regulator 66, which controls a corresponding control valve for the adjustment of the contact pressure, so that the predetermined contact pressure exists in transmission 68.

Advantageously, preliminary control 56 is constantly active and activates slippage regulator 58 only in quasi-static operating conditions of the transmission, that is, when its transmission ratio does not change, or barely changes.

The described method results in the contact force, which can be preliminarily controlled in a rapid and dynamic manner, to be finely adjusted in such a way that a predetermined target slippage, which is a function of the operating parameters of the drive train, such as engine torque, motor vehicle speed, and the like, and which can be slightly over zero, can be obtained.

The intersection point between the preliminary control and the slippage regulation, in the example shown, is provided directly by the contact force and/or by values that correspond directly with the contact force, which are added in addition step 60.

The preliminary control can take place by means of a wide variety of algorithms, for example by means of the relationship $F = M/r \cdot f(i_{var})$, where F is the contact force, M is the engine torque, r is the radius of the conical disks on which the endless torque-transmitting means revolves, and $f(i_{var})$ is a function of the transmission ratio of the continuously variable transmission, for example a polynomial whose value increases with increasing transmission ratio.

Figure 6:
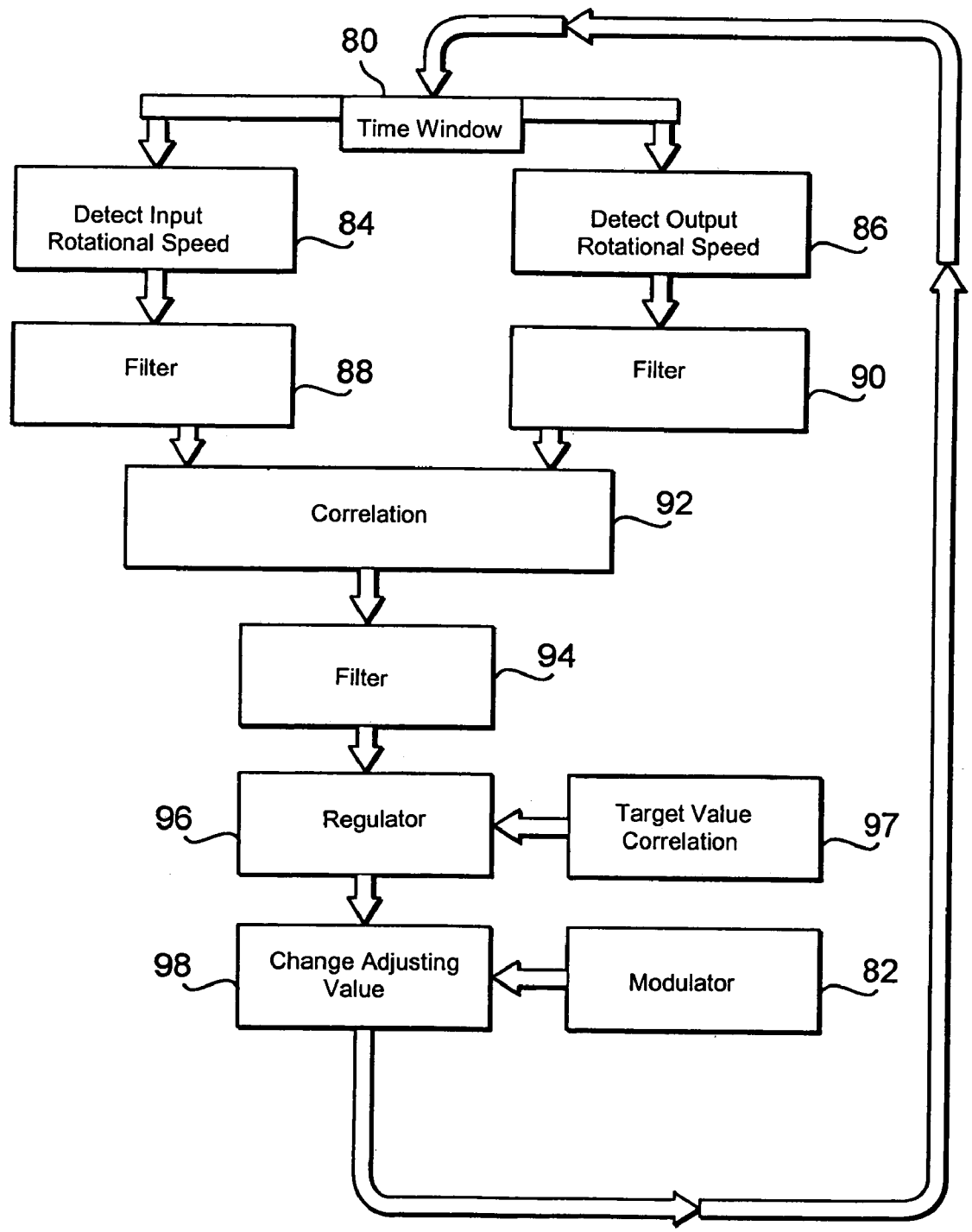
FIG. 6 is a flow diagram showing steps of a method for determining slippage.

The slippage is difficult to measure, especially when it is very small. An advantageous method for the determination of the slippage is shown in FIGS. 6 and 7.

When electronic control unit 16, as a function of certain operating values of the drive train, for example travel at a constant torque and/or a constant speed, determines a suitable time window 80, a corresponding adjusting value is modulated by a modulator 82. The adjusting value can be a pressure or a current, whereby the modulation amplitude and frequency must be selected in such a way that, on one hand, no adverse effects on the overall system exist, while, on the other hand, sufficient desired signal information can be generated. In step 84, the transmission input rotational speed is detected by sensor 22. Simultaneously, in step 86, the propeller shaft rotational speed, which can be directly converted into the transmission output rotational speed, is detected by sensor 28. It is advantageous not to connect sensor 28 directly to the propeller shaft, but to determine the rotational speed of the transmission output shaft directly by means of sensor 28, so that the measurement results are not corrupted by weak signals and oscillating masses.

In filter steps 88 and 90, the input rotational speed and output rotational speed progressions, measured during the activation time window and stored in electronic control unit 16, are subjected to, for example, low-pass, band-pass, and/or high-pass filtering. Then they are supplied to a correlation calculation step 92 in which the correlation between the filtered signal progressions is determined. The calculated correlation value, following an additional filtration in step 94, is supplied in step 96 to a regulator, in which the calculated correlation value is compared with a correlation value 97 that is stored in electronic control unit 16. In step 96 the regulator produces a correction value, which corresponds with the deviation between the target correlation value and the calculated actual correlation value, and that leads in step 98 to a change in the control adjusting value that determines the contact pressure.

It should be understood that regulator 96 can correspond with slippage regulator 58 (see FIG. 5), the target correlation value 97 can represent the target slippage (FIG. 5), and the value supplied to regulator 96 after filtering step 94 can correspond with the actual slippage, so that the output value of regulator 96, that is, the adjusting value (step 98), constitutes regulator output value RA of FIG. 5.

FIG. 7 shows a method that is advantageously applicable in the method in accordance with FIG. 6 for the detection of signals that are weaker than, for example, background noise or interference signals. The method shown in FIGS. 6 and 7 is also known as a "Lock-In" method.

Figure 7A:
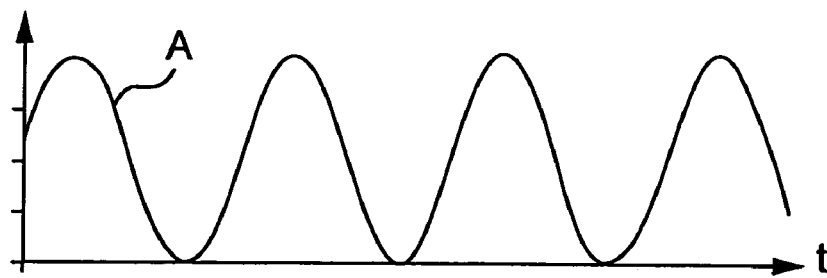
FIG. 7 shows signal patterns of signals associated with the method of FIG. 6.
Figure 7B:
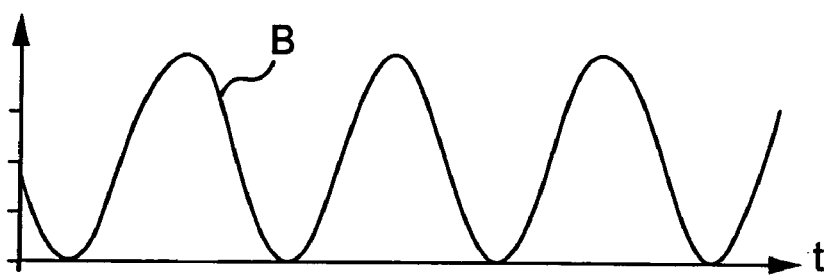

FIG. 7*a* represents as a function of time a signal A, which is, for example, the modulation signal switched into the current regulator 66. Signal B of FIG. 7*b* represents the difference between the detected rotational speeds 84 and 86.

Figure 7C:
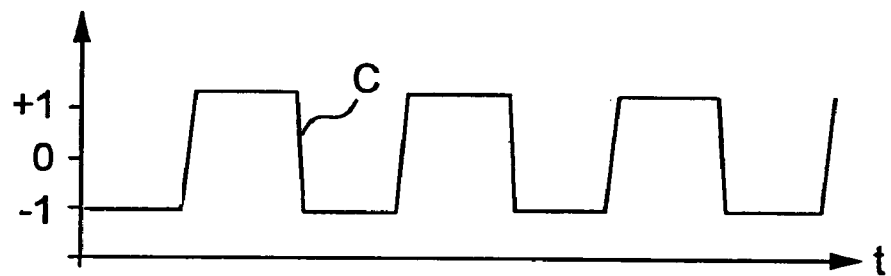
Figure 7D:
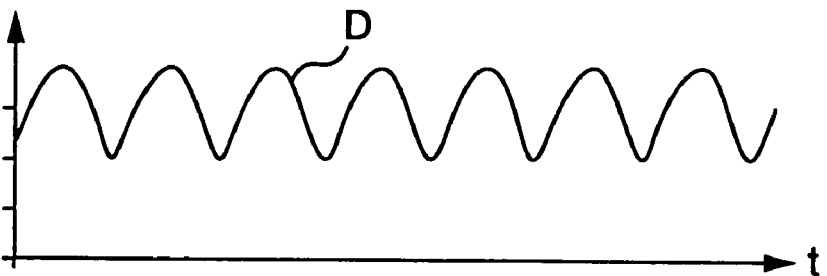
Figure 7E:
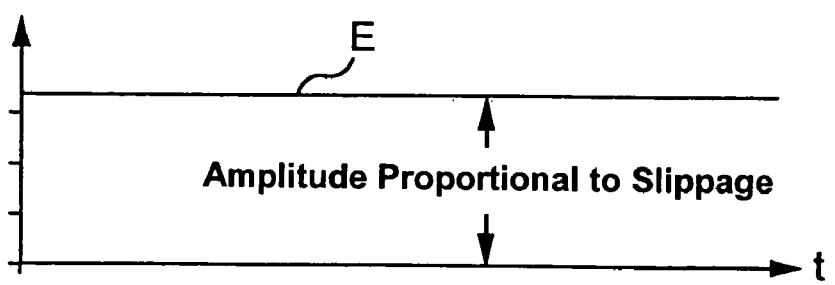

Signal C of FIG. 7*c* is derived from signal B and, in accordance with the deviation of signal A from a mean value, only assumes a value between −1 and +1. It accordingly contains the correct "phase" of signal A, which is a reference signal. If signal C is multiplied by signal B, the amplitudes of the rotational speed difference are "folded" upward in the phase of the reference signal, as represented by signal D in FIG. 7*d*. If a low-pass filter step is subsequently applied to signal D, the result is a mean amplitude, which is represented as signal E in FIG. 7*e*. The amplitude of signal E is accordingly proportional to the slippage of the variable speed unit and represents the actual slippage.

In FIG. 5, the determination of the actual slippage in accordance with FIGS. 6 and 7 is symbolized as a "Lock-In" and a filter.

As further shown in FIG. 5, for cases in which the actual slippage exceeds a predetermined threshold value, it is advantageous to generate an additional value ZW in a safety step 100. The additional value is added to the other values in addition step 60, so that the contact force is correspondingly increased. The additional value, which is switched into the force from the safety step, is advantageously calculated by means of a characteristic curve that is a function of the actual slippage as determined and, for example, of the transmission ratio of the transmission.

An advantageous further development of the method described above relates to the output signal RA of the slippage regulator and that is to be set in relation to the change in the actual slippage resulting therefrom. On the basis of that output signal, in accordance with performance characteristics stored in the control unit, a characteristic condition of the transmission can be locked in, which affects the controlling engine characteristics that influence preliminary control 56. By taking into account the results of the slippage regulation in an identification model that is utilized for the preliminary control, it is possible to improve the quality of the preliminary control. For example, a transmission ratio coefficient can be determined for the particular transmission in question, or parameters can be determined for the previously-mentioned polynomial $f(i_{var})$.

Figure 8:
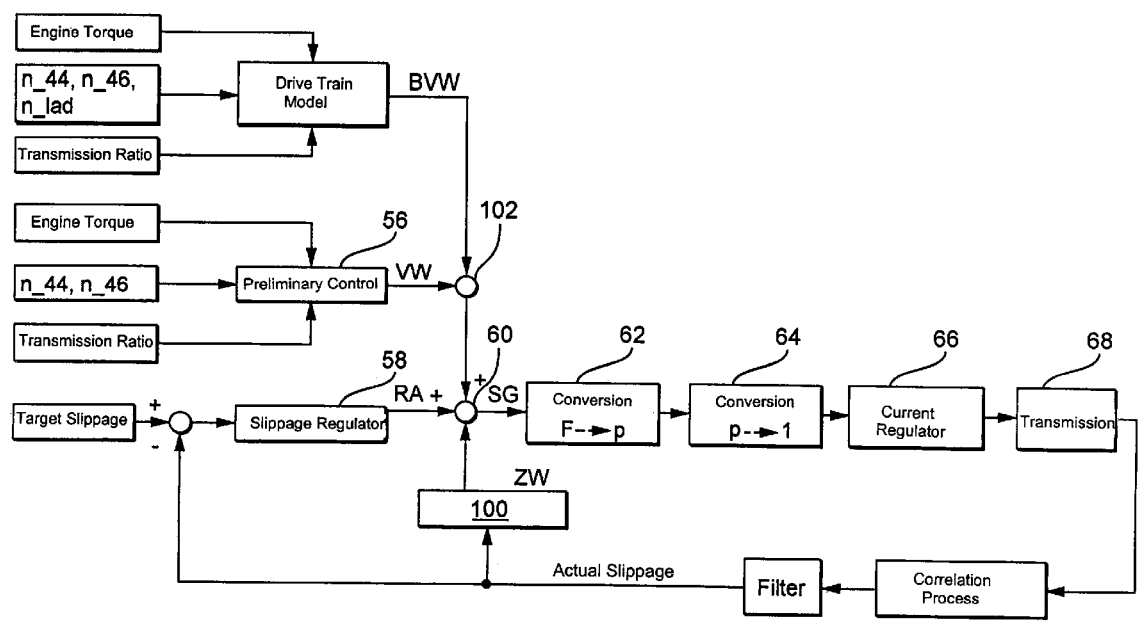
FIG. 8 is a flow diagram showing the steps of a modified embodiment of a method in accordance with the invention.

FIG. 8 shows a further development of the method in accordance with the invention, in which, besides the input values of the engine torque, the rotational speeds of the pairs of pulleys on the input and output sides, the transmission ratio of the transmission, and the target slippage, which can depend upon additional operating values, it is possible to introduce additional operating parameters, such as the rotational speed of one or several of the motor vehicle wheels and to use them as input values in a calculation model of the drive train. By means of such a calculation model, the actual rotational speeds and changes in rotational speed can be used to estimate the contact pressure requirement of the variable speed unit for a time duration forecast. Depending upon the quality of the model and the available computing power, it is possible to calculate a time duration forecast of for example 50 ms with regard to the change in the contact pressure requirement as a result of wheel-side shocks. As an output value, the drive train model delivers a calculated preliminary adjusting value BVW, which is compared in a maximum value formation step 102 with the preliminary adjusting value VW supplied by the preliminary control unit 56. The greater of the two values BVW and VW is supplied to addition step 60.

The methods described above, whose course and algorithms are stored, for example, in program storage unit 18 of electronic control unit 16, and whose engine characteristics and characteristic curves are stored in data storage unit 19, can be changed in many different ways relative to the input values that are drawn upon for the preliminary control, the slippage determination, the type of slippage regulator 58, the linking of the values VW, RA, and ZW with a target value SG, as well as the conversion of target value SG in the subsequently operative contact pressure force.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the invention.

What is claimed is:

1. A method for adjusting a contact force between two frictionally-engaged torque-transmitting components of a motor vehicle drive system, said method comprising the steps of: determining from a value of at least one motor vehicle drive system operating parameter and transmission performance characteristics stored in an electronic control unit a preliminary adjusting value for a contact force between an endless torque-transmitting means and a pair of conical disks of a continuously variable transmission having a steplessly adjustable transmission ratio, wherein each pair of conical disks includes an axially fixed disk and an axially movable disk that is movable toward and away from an associated axially fixed disk, and wherein the transmission ration is steplessly adjustable by a change of contact radii at points of contact between the endless torque-transmitting means and the pairs of conical disks; determining a slippage regulator output value by comparing an actual slippage value from a measured transmission operating parameter with a target slippage value corresponding with the transmission operating parameter; and determining in the control unit a control variable that is a function of the preliminary adjusting value and the slippage regulator output value to adjust the contact force to be applied to the torque-transmitting components in order to provide a predetermined target slippage of the torque-transmitting components of the transmission.

2. A method in accordance with claim 1, wherein the step of determining the regulator output value is only operative during quasi-static operating conditions of the drive system.

3. A method in accordance with claim 1, wherein the preliminary adjusting value and the regulator output value are in direct relationship with the contact force.

4. A method in accordance with claim 1, including the step of providing an adjusting value by adding together the preliminary adjusting value and the regulator output value.

5. A method in accordance with claim 1, wherein the preliminary adjusting value is a function of a rotational speed of the pair of conical disks and the transmission ratio of the continuously variable transmission.

6. A method in accordance with claim 1, including the step of determining the adjusting value by correlating an actual value of the operating parameter with a change in a quantity that affects the value of the operating parameter.

7. A method in accordance with claim 1, including the step of determining the preliminary adjusting value by utilizing a relationship between a change of an input value and a change in the operating parameter that is used for the regulator output value and that is a function of the input value.

8. A method in accordance with claim 1, wherein one of the torque-transmitting components is an endless torque-transmitting means and another component is a conical disk pair of a continuously variable transmission, and a regulation difference is a function of slippage between the torque-transmitting components.

9. A method in accordance with claim 8, including the step of supplying to the adjusting value an additional value when the slippage exceeds a threshold value.

10. A method in accordance with claim 1, including the step of applying to the control variable at least one additional control variable component, calculated from a model of the drive train.

11. A method for adjusting a contact force between two frictionally-engaged torque-transmitting components of a motor vehicle drive system, said method comprising the steps of: determining a preliminary adjusting value from a value of at least one operating parameter of the drive system, wherein the preliminary adjusting value is a function of a torque to be transmitted by an endless torque-transmitting means and a pair of conical disks of a continuously variable transmission having a steplessly adjustable transmission ratio; determining a regulator output value by comparing an actual value of a transmission operating parameter with a target value of the operating parameter; and determining from a control variable that is a function of the preliminary adjusting value and the regulator output value the contact force to be applied to the torque-transmitting components, wherein the preliminary adjusting value increases in magnitude with one of increasing torque, shorter transmission ratio, and smaller running radius of the endless torque-transmitting means in a pair of conical disks.

12. Apparatus for the regulation of a contact force between two frictionally engaged torque-transmitting components of a motor vehicle drive system, said apparatus comprising: a continuously variable transmission including an endless torque-transmitting means that is in frictional contact with a pair of conical disks for transmitting torque, wherein each pair of conical disks includes an axially fixed disk and an axially movable disk that is movable toward and away from an associated axially fixed disk, and wherein the transmission ration is steplessly adjustable by a chance of contact radii at points of contact between the endless torque-transmitting means and the pairs of conical disks; sensors for the determination of operating parameters of components of the transmission; a slippage regulator for providing a slippage regulator output value based upon a measured slippage value and a target slippage value; at least one actuator for adjustment of a contact force between the endless torque-transmitting means and the conical disks; and an electronic control unit that includes a microprocessor and a program and data storage unit and that receives the slippage regulator output value for controlling and adjusting the contact force provided by the actuator between the torque-transmitting components of the transmission.

* * * * *